No. 655,060.  
A. CLASSEN.  
PROCESS OF MAKING NON-COAGULABLE ALBUMINOIDS.  
(Application filed Apr. 25, 1898.)  
Patented July 31, 1900.
(No Model.)
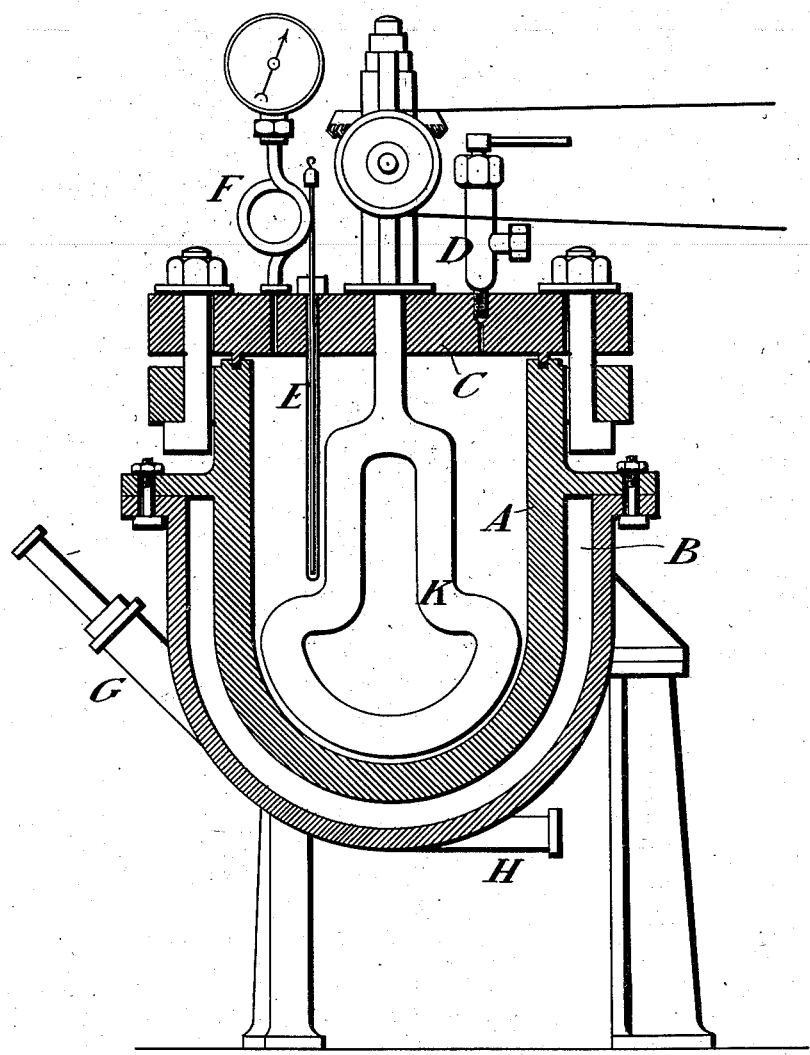
Witnesses:  
Geo. E. Sullivan  
Robert Everett
Inventor:  
Alexander Classen,  
By James L. Norris.  
Atty.

UNITED STATES PATENT OFFICE.

ALEXANDER CLASSEN, OF AIX-LA-CHAPELLE, GERMANY.

PROCESS OF MAKING NON-COAGULABLE ALBUMINOIDS.

SPECIFICATION forming part of Letters Patent No. 655,060, dated July 31, 1900.

Application filed April 25, 1898. Serial No. 678,765. (No specimens.)

*To all whom it may concern:*

Be it known that I, ALEXANDER CLASSEN, a citizen of Germany, residing at Aix-la-Chapelle, Germany, have invented a certain new and useful Process of Manufacturing Non-Coagulable Albuminous Bodies from Meat, Blood, &c., of which the following is a specification.

Attempts to liquefy albuminous bodies by heat and steam-pressure have since Wöhler's first experiments been repeated by many others in various ways. Gmelin, Mulder, Hoppe-Seyler, Neumeister, and others have especially interested themselves in this question. While some have examined from a scientific point of view the changes which the albuminous bodies undergo by this treatment, others, particularly in later years, have considered rather the practical purposes to which this process may be put in the manufacture of food. Most of the former experiments resemble each other in that the reaction took place at a high temperature (ordinarily at 150° centigrade, sometimes up to 200° centigrade) and at that steam-pressure which corresponded with the temperature in question. Thus the results were nearly the same, as it was found that the albuminous bodies under the above-mentioned conditions generally underwent a profund change. According to the temperature and the duration of the treatment a brown acid solution, which often smelled like burned horn, was obtained. Obviously such a solution could not be used as food. The manufacture of food was therefore generally restricted to the application of the natural digestive enzymes, both of animal and plant origin, (pepsin, trypsin, papayotin, &c.,) by means of which the so-called "meat peptones" are prepared; but these also contain the albumen in an advanced state of alteration, generally in the form of peptone. Many of these preparations are a great improvement on the original meat extracts, (which, as is known, contain no albumen at all,) inasmuch as they are a step nearer to the complete utilization of the meat fibrin, which is rejected in the manufacture of extracts. Such peptones are offered for sale under the names of "concentrated" or "perfect" foods, "fluid meat," and the like.

I have now found that it is possible to convert, among others, the albuminous bodies of meat into a soluble form, which differs only in several points from genuine albumen solutions, and thus the requirements which can be made respecting food are fully satisfied.

The conversion of the albuminous bodies into an incoagulable and non-peptonized form, according to my said invention, is effected by subjecting the albumen at a relatively-low temperature to a pressure which is considerably higher than that which corresponds with the temperature in question, while in the experiments mentioned before the pressure was obtained by increasing the temperature, by which process, as has been pointed out, albumen undergoes a profound change. If, for instance, the aqueous solution of a coagulable albumen (from eggs, serum, meat, fish, plants, &c.) is heated to a temperature only a few degrees higher than that of coagulation, or even higher, (coagulation of albumen, as is known, is dependent on its nature and on the presence of other substances,) and at the same time subjected to a high pressure, (under a pressure of about thirty to forty atmospheres, or even higher, the conversion takes place in a short time,) an incoagulable solution of albumen is obtained. The same is perfectly colorless and opalescent. Evaporated to dryness at a low temperature, it leaves a yellowish-white leafy mass of a silky luster, non-hygroscopic, perfectly soluble in water, and in dilute solutions not coagulable by heating. Under the same circumstances coagulable albumens instead of being in solution may also be treated in an air-dried (not perfectly dry) condition. In this way it is now possible to liquefy without peptonization the meat ablumen, (which is identical with white of egg,) together with all the other constituents of the meat extracts. With respect to meat fibrin or other kinds of insoluble albumen these substances behave analogously to all other kinds of soluble albumen, and by means of pressure and a relatively-low temperature it may be transformed into a solution which after evaporation becomes a light-yellow leafy lustrous mass, like that which is obtained from coagulable albumen. The chemical properties of these two bodies differ from each other in several points. According to the opinion of an authority in physiology the soluble meat fibrin is an intermediate body between genuine albumens and the albumoses of digestion, and its nutritive value is equivalent to that of genuine albumen.

I have now found that for conserving the original character of the albuminous bodies it is necessary to produce the pressure by means of such gases which will not peptonize nor precipitate the albuminous bodies. As to the use of air this gas is not suitable, for several reasons: first, its oxygen would produce a partial peptonization of the albuminous bodies, and, moreover, it would be necessary to purify it and to free it from carbon dioxide. When carbon dioxide is used for producing pressure, carbonic acid is formed in the liquid, and the whole quantity of soluble albumen (of the coagulable modification) is precipitated. Hence it is necessary for converting coagulable albumens into a non-coagulable modification to employ a gas which neither precipitates nor peptonizes albumen—e. g., hydrogen.

The application of the before-described method will be shown by the following examples.

Example 1: If it is a question of liquefying the soluble albumen of meat or of fish, (without separating it from the basic compounds and salts,) two kilos of finely-divided meat mixed with one liter of water are allowed to stand for one hour and then filtered and pressed through a linen cloth. The residue is heated once more with water in the same manner. If the complete extraction is not required, it will suffice to press out the meat in a squeezing-machine. The solution obtained is then heated in an autoclave, provided with a stirring apparatus, at from 80° to 125° centigrade under a pressure of nearly thirty atmospheres until transformation is complete. (The duration of the operation depends on the degree of concentration of the liquid.) An apparatus suitable for the purpose is shown in section in the accompanying drawing. A is a vessel of iron or other suitable metal surrounded in part by a steam-jacket B and provided with an air-tight cover C. Through this cover there are openings for the valve D, which admits the pressure fluid, the stirring device K, the thermometer E, and the manometer F. The pipes G and H serve for the passage of steam to and from the jacket B. If albumen is to be previously separated from the basic compounds and salts, it is precipitated from the solution by heating and then converted into the soluble modification by means of pressure. The pressure, as above mentioned, must be effected by compressing into the vessel an appropriate gas or liquid of any kind. The solution obtained in this manner is evaporated to dryness in flat pans or more rapidly $in\ vacuo$. In presence of small quantities of fat a small quantity of an alkali carbonate or another compound of similar action is added to the solution.

Coagulable albumens in general behave like soluble meat albumen. They are converted into the non-coagulable modification, as above described, either in a solid or a liquid condition or suspended in water.

Example 2: The insoluble residue which remains after the treatment of meat with water consists, as is known, chiefly of meat fibrin, gelatin, and fat. To convert the fibrin freed from gelatinous substances into the soluble modification, the method described in Example 1 can generally be applied. A small quantity of alkali carbonate or magnesia (about one gram of the latter per kilo) is added in order to prevent the formation of free acids, (caused by the decomposition of fat.) The solution of fibrin separated by filtration from fat (and it may be from magnesia) is treated in the same manner as under Example 1. The pressure can be produced in the same manner as under Example 1. Fibrins of any other origin are treated in the same manner as meat fibrin.

Example 3: In applying this process to meat without separating the soluble constituents one-half or one liter of water, with a sufficient quantity of alkali carbonate, magnesia, or similar compounds, is added to one kilo of meat, and the whole mixture is treated as described under Example 2. As the gelatinous substances of meat are easily transformed into peptone a certain quantity of the latter will always be found in the product.

Having thus described the nature of this invention and the best means I know for carrying the same into practical effect, I claim—

The herein-described process of converting albuminous bodies into soluble albumen without peptonization, which consists in first heating albuminous bodies with water at a temperature between 80° and 125° centigrade in an autoclave under pressure produced by hydrogen, said pressure being higher than that produced by the steam, and then evaporating the liquid at a low temperature.

In testimony whereof I have hereunto set my hand in presence of two subscribing witnesses.

ALEXANDER CLASSEN.

Witnesses:
 GORDON SCOTT,
 JEAN HECKMANNS.